United States Patent Office 3,337,905
Patented Aug. 29, 1967

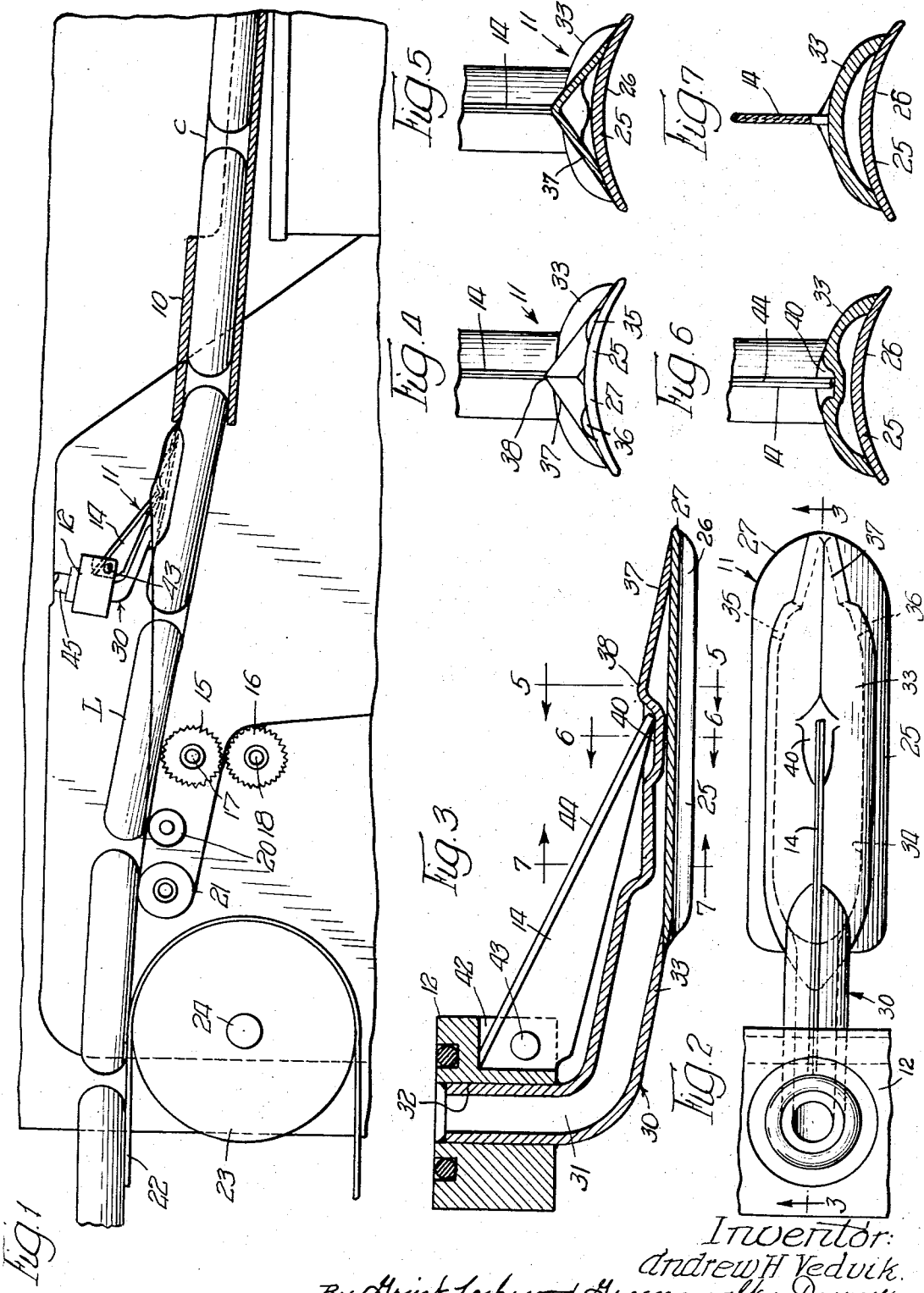

3,337,905
SAUSAGE SKINNING MACHINE
Andrew H. Vedvik, Madison, Wis., assignor to Oscar Mayer & Co., Inc., Chicago, Ill., a corporation of Illinois
Filed Sept. 17, 1965, Ser. No. 487,987
3 Claims. (Cl. 17—1)

This invention relates to the manufacture of sausages and is more particularly concerned with improvements in mechanism for removing in a rapid and efficient manner the casing or skin from a plurality of connected sausage links.

Machines have heretofore been developed for removing the casing from sausage links which have been produced by stuffing a casing formed of cellulose film or similar material, dividing the casing into a plurality of individual links by constricting a small section of the casing between the links and then processing the connected links by cooking, smoking or other treatment necessary to prepare the product for market. One such skinning machine which has been employed when the casing has been constricted by twisting between the links is disclosed in Grey Patent No. 2,689,971, dated Sept. 28, 1954. While this type machine and others of a similar character have been employed successfully for handling the skinning operation, there have been objections to these machines, particularly when employed for removing casing from sausages with very tender and soft skin, because scoring and marking of the product generally results. Therefore, it is a general object of the present invention to provide an apparatus for removing the casing from processed sausage links which will not mark or score the surface of the product in an objectionable manner.

It is a more specific object of the invention to provide an apparatus for removing the casing from encased sausages which incorporates a nozzle and slitting knife assembly for loosening the casing and slitting the same wherein the nozzle assembly is so constructed that when it is employed with sausages which have a very tender and soft skin, such as, for example collagen encased pork sausages, scoring and marking of the surface of the sausages does not occur.

These and other objects and advantages of the invention will be apparent from a consideration of the skinning machine which is shown by way of illustration in the accompanying drawings wherein:

FIGURE 1 is a view, partially in side elevation and partially in longitudinal section, showing a sausage skinning apparatus which incorporates the principal features of the invention;

FIGURE 2 is a partial plan view showing the nozzle and slitting knife assembly;

FIGURE 3 is a longitudinal section taken on the line 3—3 of FIGURE 2;

FIGURE 4 is an end elevation at the leading end of the nozzle of FIGURE 3; and

FIGURES 5, 6 and 7 are cross sections, to an enlarged scale, taken on the lines 5—5, 6—6 and 7—7, respectively, of FIGURE 3.

Referring first to FIGURE 1 of the drawings, there is illustrated an apparatus for skinning sausages which are produced by stuffing an artificial casing of suitable size with a sausage batter, dividing the casing into links of the desired length by constricting the casing in a small area between successive links and thereafter cooking and smoking or otherwise processing the sausages. The apparatus illustrated is adapted to receive the string of encased sausage links L with the casing C having the constricted portions between the links opened up so that successive links are spaced from each other inside the continuous tube or casing. The encased sausages are fed into the machine through a guide tube 10 having a slightly larger cross sectional diameter than the corresponding dimension of the sausages. The guide tube 10 delivers the sausages to a nozzle and slitting knife assembly 11 which is supported in depending relation from a mounting block 12. The assembly 11 has an end in the form of a plough and a curved bottom face adapted to ride on the top of successive sausage links L, between the surface of the sausage and the casing enclosing the same. The assembly 11 includes a slitting blade or knife 14 which is disposed in a vertical plane extending above the same so as to slit the casing C longitudinally and open it for removal of the sausage links L. The slit casing is stripped from the links by threading the same between a pair of knurled rollers 15 and 16 which are mounted on parallel, transverse shafts 17 and 18 which are driven by a suitable means so that the rollers 15 and 16 co-operate with each other in advancing the waste casing beneath the path of the sausages L, the latter being forwarded over guide rollers 20 and 21 to a discharge conveyor belt 22 which is supported on the end pulley or roll 23 carried on a cross shaft 24 in the machine.

The nozzle and slitting knife assembly 11 (FIGURES 2 to 7) is of special construction which particularly adapts the same for the skinning of sausage products having a very tender and soft skin, for example, collagen encased sausages. The assembly 11, when disposed as shown in FIGURE 1, comprises a bottom plate 25 having a bottom face 26 which is concave in cross section with a curvature conforming approximately to the curvature of the surface of the sausages and a smooth rounded end edge 27 which is adapted to engage between the top surface of the sausages and the inside of the casing. It is secured on the lower end of an L-shaped section of tubing 30 which has been cut and shaped as shown in FIGURES 2 to 7 and closes the bottom opening which results from cutting away the bottom wall of the tubing. The tubular section 30 comprises a short vertical leg 31 which is secured at its upper end in a bore 32 in the supporting block 12 and a somewhat longer leg 33 which is disposed in a generally horizontal plane when mounted as shown in FIGURE 1. The horizontal leg 33 is shaped as shown and the bottom wall is cut so as to fit the top of the plate 25 (FIGURES 2 to 7). The elongate bottom opening 34, which results from the shaping and cutting and which is closed by the plate 25, is relatively wide as shown in FIGURE 2 so as to provide an air chamber of substantial cross section with laterally spaced, laterally directed openings forming air discharge holes 35 and 36 adjacent the end 27 thereof. The top wall of the free end portion 37 of the tube 30 is inclined upwardly from the sides of the tube and away from the end 27 of the bottom plate in the direction of the vertical leg 31 with converging surfaces extending to a point 38 where they form an upward bulge and then dip into a pocket 40 for receiving the small end of the generally triangular shaped knife blade 14. The blade 14 has its opposite end secured in a slot 42 in the mounting block 12 by a cross pin or bolt 43. The cutting edge 44 of the blade 14 is upwardly inclined from the pocket 40.

The air nozzle and slitting knife assembly 11 is mounted in the bracket 12 with the lower portion adapted to be disposed relative to the path of the sausages so that the rounded end 27 of the curved sausage engaging plate or shoe 25 rides on the top surface of the sausages with the plate edge 27 forming a plough for entering between the body of each successive sausage link L and the casing C. Air is supplied to the tube 30 by connecting the vertical leg 31 to a compressed air line, indicated at 45 in FIGURE 1. The air is discharged through the relatively small air holes or openings 35 and 36 with sufficient force to balloon a portion of the casing ahead of or beyond the shoe edge 27 and loosen the casing around at least the top portion of each successive sausage. The plate member 25 has a length which is less than the length of the sausages but which is sufficient to span between two successive sausage links L so that any tendency for the end edge 27 which first engages the sausages to dig into the wall of the sausage as successive sausages are advanced beneath the assembly 11 is reduced to a minimum.

While the casing loosening and slitting assembly 11 is shown in combination with a particular guide apparatus for feeding the encased sausages to the assembly and for stripping the slit casing, or separating the casing and sausages, the assembly may be used with other apparatus for advancing the strings of sausages and completing the separation of the casing and sausages after the casing is slit.

I claim:

1. In a machine for slitting and removing the casing from sausages, a casing loosening and slitting assembly comprising a shoe forming plate bent to provide a sausage engaging face having a curvature which will conform approximately to the curvature of the top surface of sausages advanced beneath the same, a hollow air tube having a section of the side wall at one end thereof cut away and fitted against the opposite face of said plate so as to close the opening formed by cutting away the side wall and to form with said plate an air chamber, the tube having the other end thereof mounted in a supporting bracket and connected to a compressed air supply line, a casing slitting blade extending along the top of the tube opposite said plate, the side wall of the tube which is opposite the plate being shaped at said one end of the tube to provide intersecting surface portions which are inclined upwardly from the sides and from said one end of the tube to a point spaced a relatively short distance therefrom in the direction of the other end of the tube where said surfaces merge into a pocket in which the end of the slitting blade is mounted so that the area of the casing which is to be slit is stretched as it approaches the blade, and said tube having transversely spaced air holes at the juncture of said inclined surfaces with the surface of the plate through which streams of air are directed to loosen the casing as the end of the assembly enters between the casing and the sausages.

2. A plow-like air nozzle assembly for loosening and slitting the casing on a string of sausages, which assembly comprises a bent air tube mounted on a support and having a vertically disposed portion connected to a compressed air line and a horizontally disposed portion adapted to ride on the top surface of sausages which are advanced in a generally horizontal path beneath the same, said horizontally disposed portion having its bottom wall cut away at the sausage engaging end opposite the vertically disposed tube portion so as to form a relatively wide elongate opening, an elongate shoe forming plate mounted in closure forming relation in said opening with its side portions curved downwardly and its bottom face conforming approximately to the upper face of the sausages so as to provide a substantial area of engagement therewith, a casing slitting blade mounted on the top side of said horizontally disposed tube portion, said horizontally disposed tube portion having its top wall shaped to provide a pocket spaced from the end which is first engaged by the sausages for receiving the lower end of the casing slitting blade and downwardly tapering wall sections which converge toward said sausage engaging end of said horizontal tube portion, and said tapering wall sections forming an upward bulge at the entrance to the pocket and having laterally spaced air holes adjacent said sausage engaging end for directing streams of air in diverging relation between the surfaces of the sausages and the casing to loosen the casing.

3. A plow-like assembly for loosening and slitting the casing on a plurality of sausages, which assembly comprises a bent tube mounted on a support and having a vertically disposed portion adapted to be connected to a compressed air line and a horizontally disposed portion adapted to ride above the top surface of sausages which are advanced in a generally horizontal path beneath the same, said horizontally disposed portion having a relatively wide, elongate bottom opening extending from the free end thereof, an elongate shoe forming plate mounted in closure forming relation over said opening with its side margins extending downwardly to conform approximately to the upper surface of the sausages so as to provide a substantial area of engagement therewith, a casing slitting blade mounted on the top of said horizontal tube portion, said horizontal tube portion having in its top wall a recess spaced from the free end thereof in which the lowermost end of the casing slitting blade is mounted and said horizontal tube portion having converging wall sections leading to the free end of said horizontal tube portion and defining an upward bulge at the lowermost end of said blade, and said converging wall sections having laterally directed air holes at the plate surface adjacent said free end for directing streams of air in diverging relation between the surfaces of the sausages and the casing to loosen the casing.

References Cited
UNITED STATES PATENTS

| | | | |
|---|---|---|---|
| 2,623,237 | 12/1952 | Schaller | 17—1 |
| 2,725,591 | 12/1955 | Cline et al. | 17—1 |
| 2,779,968 | 2/1957 | Hensgen | 17—1 |
| 3,149,369 | 9/1964 | Cross et al. | 17—1 |

LUCIE H. LAUDENSLAGER, *Primary Examiner.*